UNITED STATES PATENT OFFICE.

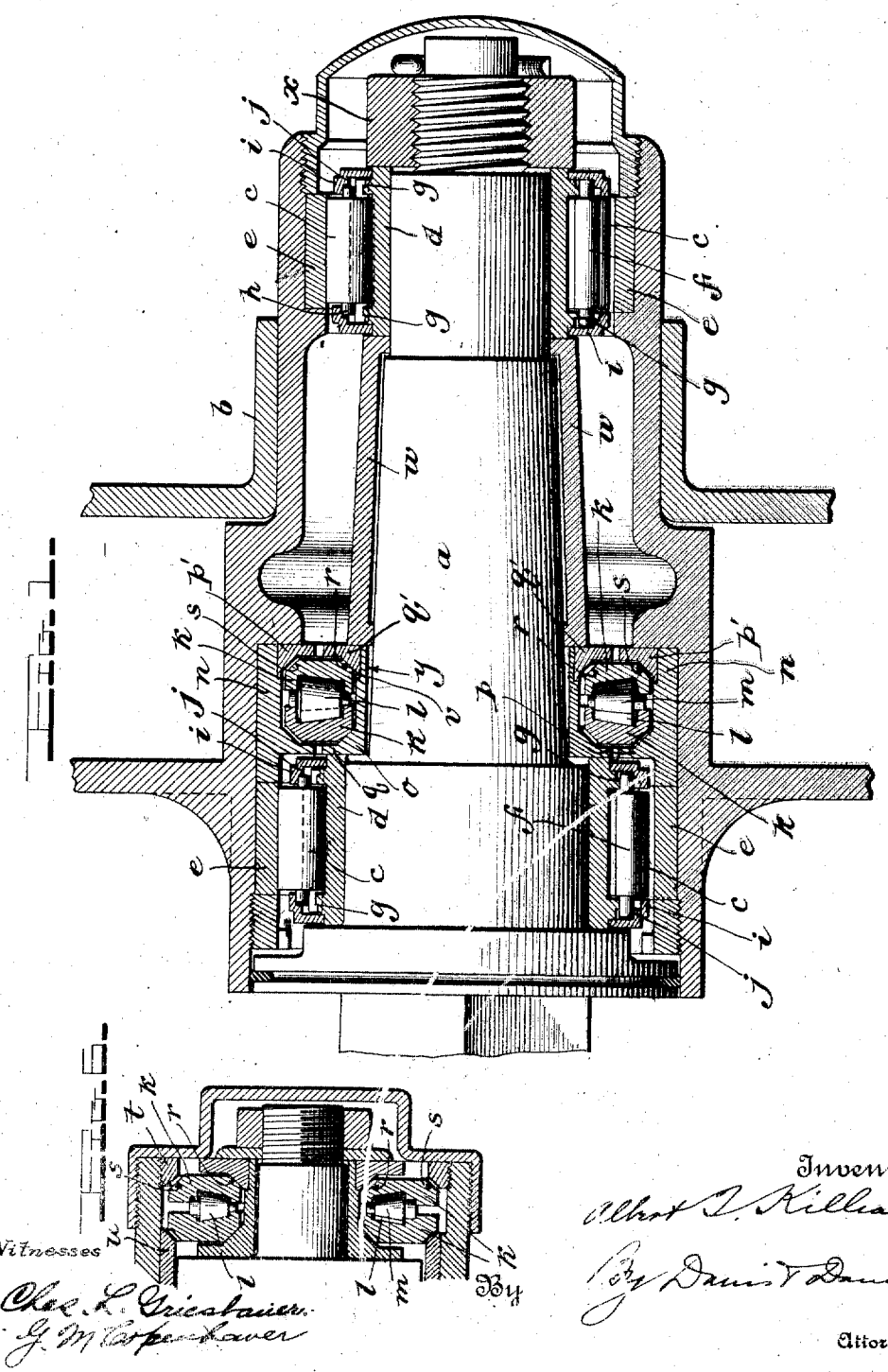

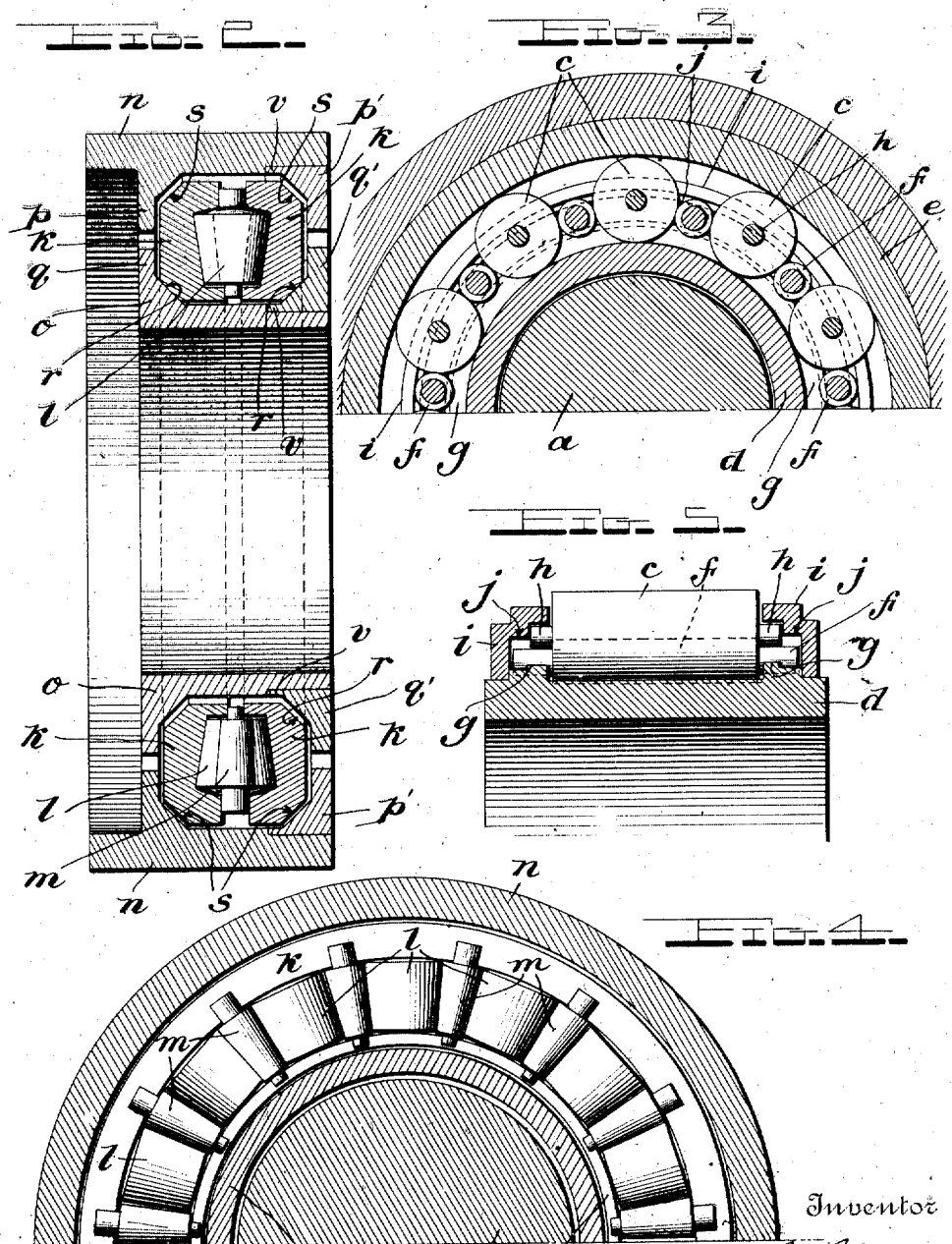

ALBERT T. KILLIAN, OF BUFFALO, NEW YORK.

THRUST-BEARING.

1,228,567.  Specification of Letters Patent.  Patented June 5, 1917.

Application filed August 13, 1913. Serial No. 784,581.

*To all whom it may concern:*

Be it known that I, ALBERT T. KILLIAN, a citizen of the United States of America, and a resident of Buffalo, in the county of Erie and State of New York, have invented new and useful Improvements in Thrust-Bearings, of which the following is a specification.

Figure 1 is a sectional view showing my invention applied to a vehicle hub,

Fig. 2 a transverse section of the thrust bearing removed from the box,

Fig. 3 a transverse section through one of the radial bearings,

Fig. 4 a transverse section through the thrust bearing,

Fig. 5 a radial section through one of the radial bearings and

Fig. 6 a radial section showing the manner of applying one feature of my present invention to the structure covered by my former Patent, Number 939,269, November 9, 1909.

The principal object of the present invention is to improve the type of thrust bearing covered by my former Patent, No. 939,269, November 9, 1909, rendering that type of bearing more sensitive and delicate in operation, to thereby eliminate a large portion of the friction which occurs before the thrust bearing comes into full action, and to also render the bearing, to use a shop term, fool-proof, in that the adjustment of the parts need be required, if at all, only at long intervals and can be accomplished then only by dismantling the bearing, as more fully hereinafter set forth.

Referring to the drawings by reference characters, $a$ designates the stationary member of the bearing, which in the present instance, is a vehicle axle, and $b$ the rotary member, this being in the present instance a vehicle hub. The radial or load-sustaining bearings consist of two sets of load-sustaining rollers $c$, one set being at each end of the axle. These rollers bear upon an inner sleeve $d$ affixed to the axle and an outer sleeve $e$ removably set in the hub. Spacing rollers $f$ are mounted between the rollers $c$, the trunnions of these rollers resting upon annular flanges $g$ formed on the sleeve $d$.

The load rollers $c$ are provided with trunnions $h$, which, together with annular caps $i$ affixed to the sleeve $d$, serve to hold the load rollers in position during assembling. Each cap is provided with an inwardly projecting annular shoulder $j$ which overhangs the trunnions of the spacing rollers and serves to confine the spacing rollers not only during assembling but also after the bearing is put into use. It will be observed that the axes of the spacing roller are located nearer to the center of the bearing than the axes of the load rollers; the object of this is to bring the lines of contact between the spacing rollers and the load rollers inside of a circle drawn through the axes of the load rollers, so that all tendency of the load rollers to thrust the spacing rollers outwardly out of contact with the load rollers is thereby eliminated.

The thrust bearing is located within the hub at a point between the two radial bearings. This location being especially advantageous in that it utilizes a space which has heretofore been unutilized and also in that it shortens the bearing as well as tends to distribute the thrust strains equally throughout the bearing. This thrust bearing is constructed substantially in accordance with the thrust bearing covered by my aforementioned patent. It consists of a pair of similarly shaped race rings $k$ whose adjacent faces are respectively provided with an annular channel in which is confined a series of thrust rollers $l$ and a series of spacing rollers $m$.

The race rings are inclosed in two sleeves, $n$ and $o$, the sleeve $n$ being fitted movably into the hub and the sleeve $o$ being removably fitted to the axle. The sleeve $n$ is provided with a pair of separated inwardly extending annular flanges $p$ and $p'$, the latter being removable from the sleeve. The sleeve $o$ is provided with corresponding outwardly extending flanges $q$ and $q'$, the latter being removable. These flanged sleeves form an annular channel in which the race rings are freely inclosed, being supported by gravity alone. The outer corners of the inner faces of the race rings are beveled off at $r$, and these beveled annular faces rest upon similarly beveled faces at the juncture of the flanges $q$ and $q'$ and the body of the sleeve and thus tend to bring the two race rings together upon the interposed rollers by a cam-like action. The outer corners of the race rings are similarly beveled off at $s$ and these beveled parts are adapted to come into contact at certain times with similarly beveled annular surfaces formed on the outer sleeve $n$ at the juncture thereof with its flanges $p$ $p'$.

It will be observed that the proportions of the parts are such that when the race rings are in place they hang loosely on the beveled faces of the inner sleeve, there being a clearance at all points between the race rings and the surrounding parts, so that when the rotary member of the bearing is subjected to no end thrust in either direction, the thrust bearing will be entirely idle. The action of the thrust bearing will be fully understood by following the action of the members when an outward thrust comes upon the hub; when the hub is subjected to such a thrust the following action takes place: The left hand beveled face of the sleeve $n$ first engages an adjacent beveled face on the adjacent race ring and if the thrust is sufficient, the opposite ring will be swung or pushed against the right hand flange of the sleeve $o$ and at the same time the adjacent race ring will be (by reason of the cam-like action of the beveled face) lifted sufficiently to be freed entirely from the sleeve $o$, whereupon it rotates with the hub. If the thrust be sufficient, the left hand race ring will be brought solidly into contact with the flange $q$ and will rotate with the hub, and the right hand race ring will be jammed hard against the flange $q'$ and will be held stationary by the axle. The same movement of the parts, but in the reverse order, will take place when the thrust on the vehicle hub is in the opposite direction.

It will be seen from the foregoing that my present improvements differ from my former patented structure heretofore referred to in that the outer or rotary member of the bearing is provided with annular beveled or cam faces which serve to shift or take up one of the race rings and relieve it of contact with the non-rotary member of the bearing upon the slightest thrust. In this way I eliminate all of the rubbing action between the surface of the parts constituting the thrust bearing and thus render the thrust bearing exceedingly sensitive and completely anti-friction in character.

In Fig. 6 I show the present improvements adapted to the exact type of bearing shown in my former patent, this bearing being adaptable for carrying out the present invention by simply beveling the adjacent corners of the annular parts $t$ and $u$ affixed to the hub.

The object in making the flanges $p'$ $q'$ removable from their sleeves is not only to render assembling of the parts easy but also to render it easy to compensate for wear of the parts that may take place from use. Should the parts of the thrust bearing wear sufficiently to require adjustment, the flanges $p'$ $q'$ may be removed and their annular flanges $v$ ground off sufficiently to bring these removable flanges closer to the opposite stationary flanges. It will be seen that these flanges $v$ abut annular shoulders on the respective sleeves $n$ and $o$, so that when they are ground off and replaced, these flanges will slide farther onto the sleeves and thus bring their friction faces closer to the adjacent race ring and thus compensate for wear in parts of the thrust bearing. It will be seen that the annular flange $v$ projects beyond the beveled part of the ring, so that a considerable part of the flange $v$ may be ground off to take up wear, as stated, without affecting the bevel in the least.

It will be observed that the sleeve $n$ is held removably in the hub by the bearing sleeve $e$ and that the inner sleeve $o$ is clamped in place on the axle between a sleeve $w$ and the sleeve $d$, said sleeve $w$ being in turn clamped in place removably by means of the removable outer bearing sleeve $d$. It will be observed that there is a clearance $y$ between sleeve $o$ and the axle; the purpose of this is to insure the sleeve $o$ being trued by the simple rotation of the hub, this truing operation being brought about before the sleeves $d$ and $w$ are clamped up tightly by the axle nut $x$. It will be understood that this invention is equally applicable to a bearing in which the inner or shaft member rotates in a stationary or box member and that in this case the annular clearance $y$ will be arranged for between the outer sleeve $u$ and the stationary or box member. It will be understood, also, that instead of having race rings hanging on the inner member of the axle, they may be supported upon the outer member when said member is a stationary box instead of the rotary hub. It will be understood also that the details of the construction of my bearing may be departed from without departing from the spirit of my invention.

I claim:

1. In a thrust bearing, an inner member, an outer member, means carried by said members forming therewith an annular channel surrounding the inner member, the inner and outer corners of said channel being each provided with an annular beveled face, a pair of race rings loosely mounted in said channel and having their corners adapted to engage said beveled faces, and a series of anti-friction elements arranged between said race rings.

2. In a thrust bearing, the combination of an inner member, an outer member, means forming therewith an annular chamber having beveled corners, a pair of race rings loosely mounted in such annular chamber and having their outer corners beveled to correspond with the beveled corners of the annular chamber, and anti-friction elements arranged between said race rings.

3. In a thrust bearing, an inner member, an outer member, means carried by said members forming therewith an annular channel surrounding the inner member, the corners of said channel being each provided with an annular beveled face, a pair of race rings loosely mounted in said channel and having their corners beveled so as to be adapted to engage said beveled faces, and a series of anti-friction elements arranged between said race rings, said means forming an annular chamber consisting of inner and outer sleeves each provided with an annular flange, the flanges at one side being removable.

4. In a thrust bearing, an inner member, an outer member, a sleeve affixed to each of said members so as to form an annular chamber, each sleeve being provided with annular flanges having beveled inner corners, the flanges at one side being removable from the sleeves and each being provided with an annular extension $v$ projecting beyond said beveled corners, the sleeves being provided with internal shoulders against which the inner ends of said flanges $p$ abut, for the purpose set forth.

5. In a thrust bearing, the combination of an axle or shaft, sleeves thereon, a bearing ring clamped between said sleeves and supported thereby, a clearance being provided between this ring and the axle or shaft, means for clamping the sleeves against said ring, a rotary member surrounding the axle structure and carrying a companion thrust ring, and anti friction thrust bearing devices engaging said rings.

In testimony whereof I hereunto affix my signature in the presence of two witnesses.

ALBERT T. KILLIAN.

Witnesses:
ABRAHAM L. PENNOCK,
ISAAC MICHENER.